Dec. 26, 1950 D. MITCHELL Re. 23,313

TRANSMISSION SYSTEM

Original Filed May 13, 1941 3 Sheets-Sheet 1

INVENTOR
D. MITCHELL
BY H. A. Burgess
ATTORNEY

Dec. 26, 1950 D. MITCHELL Re. 23,313

TRANSMISSION SYSTEM

Original Filed May 13, 1941 3 Sheets-Sheet 2

INVENTOR
D. MITCHELL
BY
H. A. Burgess
ATTORNEY

Dec. 26, 1950 D. MITCHELL Re. 23,313
TRANSMISSION SYSTEM
Original Filed May 13, 1941 3 Sheets-Sheet 3
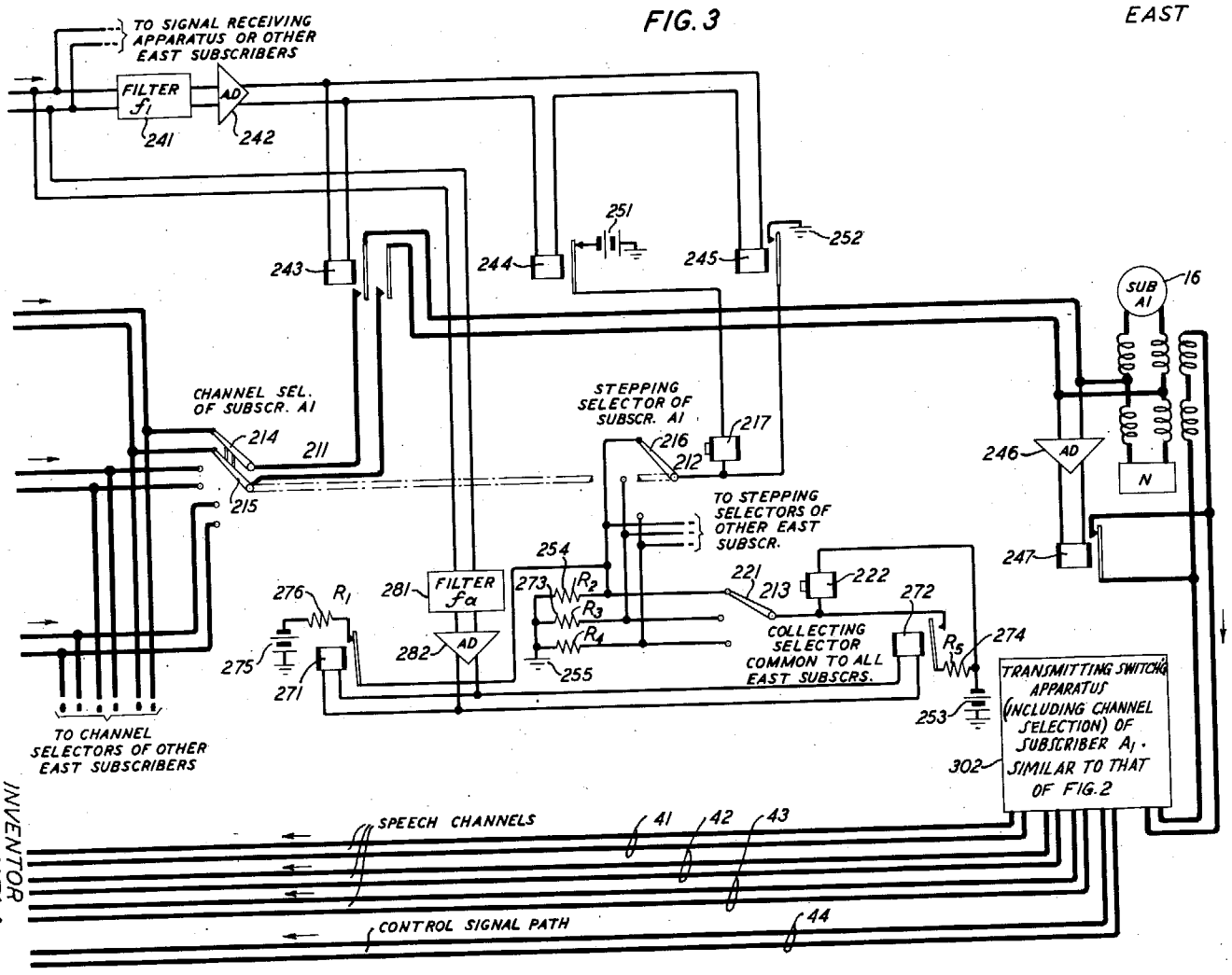
INVENTOR
D. MITCHELL
BY H. A. Burgess
ATTORNEY Reissued Dec. 26, 1950

Re. 23,313

UNITED STATES PATENT OFFICE 23,313

TRANSMISSION SYSTEM

Doren Mitchell, Martinsville, N. J., assignor to Bell Telephone Laboratories, Incorporated, New York, N. Y., a corporation of New York Original No. 2,301,223, dated November 10, 1942, Serial No. 393,196, May 13, 1941. Application for reissue February 9, 1950, Serial No. 143,311

9 Claims. (Cl. 179—1.5)

Matter enclosed in heavy brackets [ ] appears in the original patent but forms no part of this reissue specification; matter printed in italics indicates the additions made by reissue

This invention relates to a transmission system and more particularly to a speech transmission system of the type utilizing a plurality of one-way speech transmission channels.

An object of the invention is the achievement of increased efficiency in the operation of a speech transmission system by reduction of the "idle time" of the various one-way speech transmission channels.

Another object of the invention is the transmission of messages in such a manner that intelligible reception of the messages by unauthorized persons will be rendered difficult.

A more specific object of the invention is reduction of the frequency band required for transmission of the signals necessary for control of switching operations incidental to the speech transmission.

In accordance with a specific embodiment of the invention, a plurality of one-way speech channels are associated with a larger number of subscribers' telephone circuits; for example, six speech channels (three west-east channels and three east-west channels) may be associated with ten different subscribers' telephone circuits (five at the west terminal and five at the east terminal). Switching means are provided whereby an idle speech channel is selected for transmission of each different speech portion of vocal interval duration occurring in the various subscriber's telephone circuits. The switching means provided is effective, when a speech fragment of vocal interval duration is applied to a speech channel, to preselect the "next" idle speech channel, that is, the channel to which the speech fragment of vocal interval duration occurring next will be applied.

It will be obvious that the arrangement is effective as a "speech channel saver" from the statement above which points out that the number of subscriber's telephone circuits served by the speech channels is greater than the number of said channels. This makes it possible to take advantage of the now well established fact that during a so-called conversation period on any four-wire circuit, either one-way channel is actually in use only about one-third of the time. Privacy of transmission is attained by the arrangement contemplated in view of the fact that snatches of several different conversations appear in a random manner on any one of the various speech channels.

A feature of the invention is switching means effective, when a speech fragment of vocal interval duration is applied to a speech channel, to preselect both the near, or transmitting, end and the distant, or receiving, end of the next idle speech channel, that is, the channel to which the speech fragment of vocal interval duration occurring next will be applied.

Preselection of the distant end of the next channel at the same time the near end of the channel is preselected is a particularly valuable feature of the invention as it makes possible a substantial reduction in the frequency band required for transmission of the signals necessary for control of the switching apparatus. Obviously, if a channel saving arrangement is to function with full efficiency the frequency band required for the control signals must be kept within relatively narrow limits.

In general, the term "vocal interval" as used herein means the duration of one or a succession of syllables no one of which is separated from the preceding syllable by an interval as great as the "hang-over time" of the system, weak beginnings and endings, i. e., portions not capable of causing relay operation, being considered parts of the silent interval. Hang-over time is a term commonly used in connection with systems including voice operated devices and it means the period that a voice-operated device remains, due to its own characteristics, in operated position after the operating impulse has been removed. Hang-over time insures that weak endings of syllables, not capable by themselves of holding the relays in operated position, will not be lost by clipping and may be increased or decreased in duration as the type of system demands.

Full understanding of the operation of the arrangement contemplated by the invention as well as appreciation of the various advantageous features thereof may be gained from consideration of the following detailed description in connection with the accompanying drawings in which:

Fig. 3 shows in detail the receiving switching arrangement associated with one of the subscriber's telephone circuits of Fig. 1.

Figure 1:
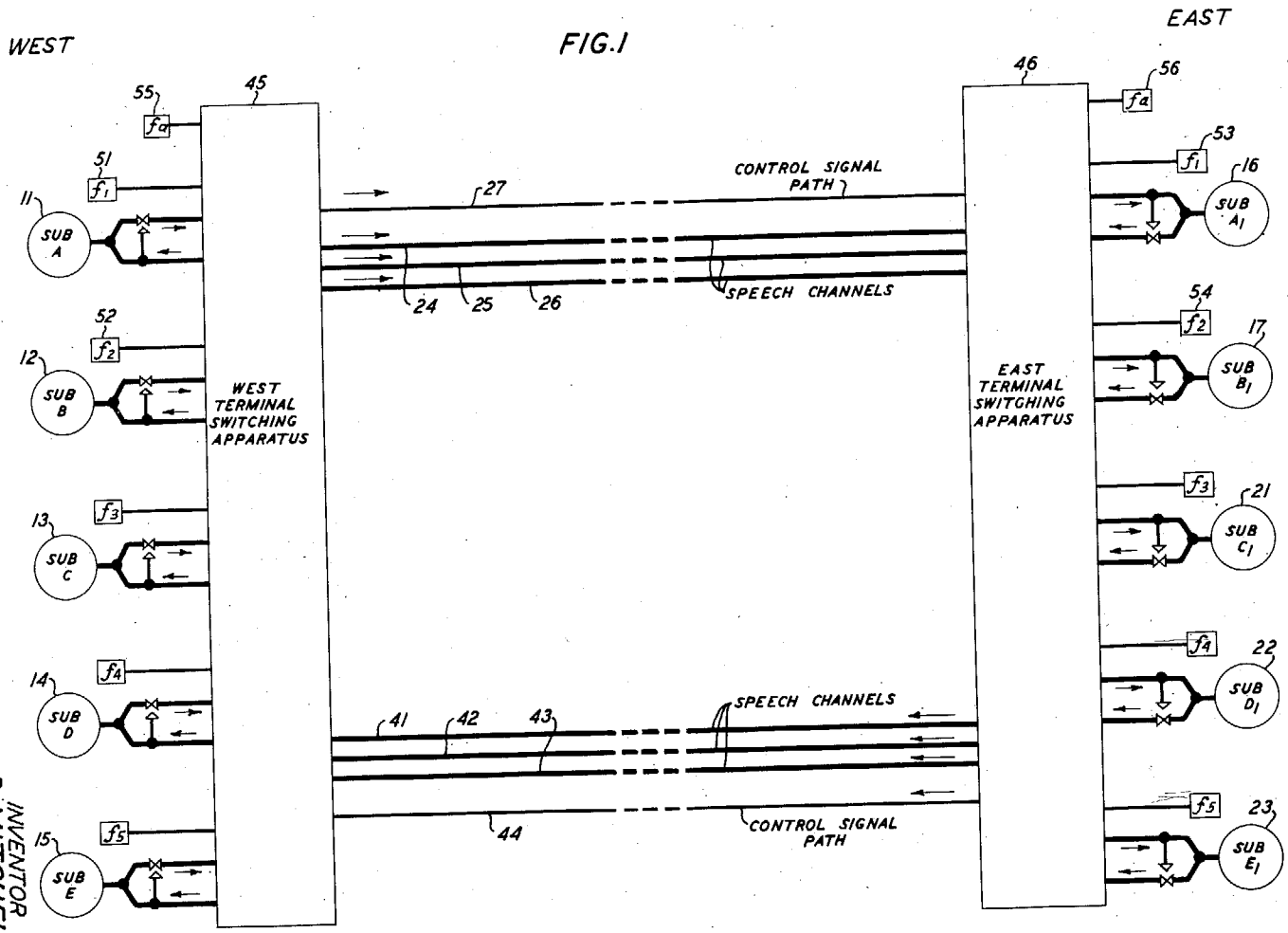
Fig. 1 shows diagrammatically a two-way telephone system embodying features of the present invention.

Referring now to the drawings there are represented in Fig. 1 two terminals, west and east, of a two-way telephone system which may be, for example, a two-way radio or line wire telephone system. Five subscribers' sets 11, 12, 13, 14 and 15 are shown at the west terminal, each of which is provided with a suitable two-way subscriber's telephone set; similarly five subscribers' sets 16, 17, 21, 22 and 23, are shown at the east terminal, each of these sets likewise being provided with a suitable two-way subscriber's telephone circuit.

The west and east terminals are connected by three west-east speech transmission channels, 24, 25 and 26, one west-east control signal channel 27, three east-west speech transmission channels 41, 42 and 43 and one east-west control signal channel 44.

Figure 2:
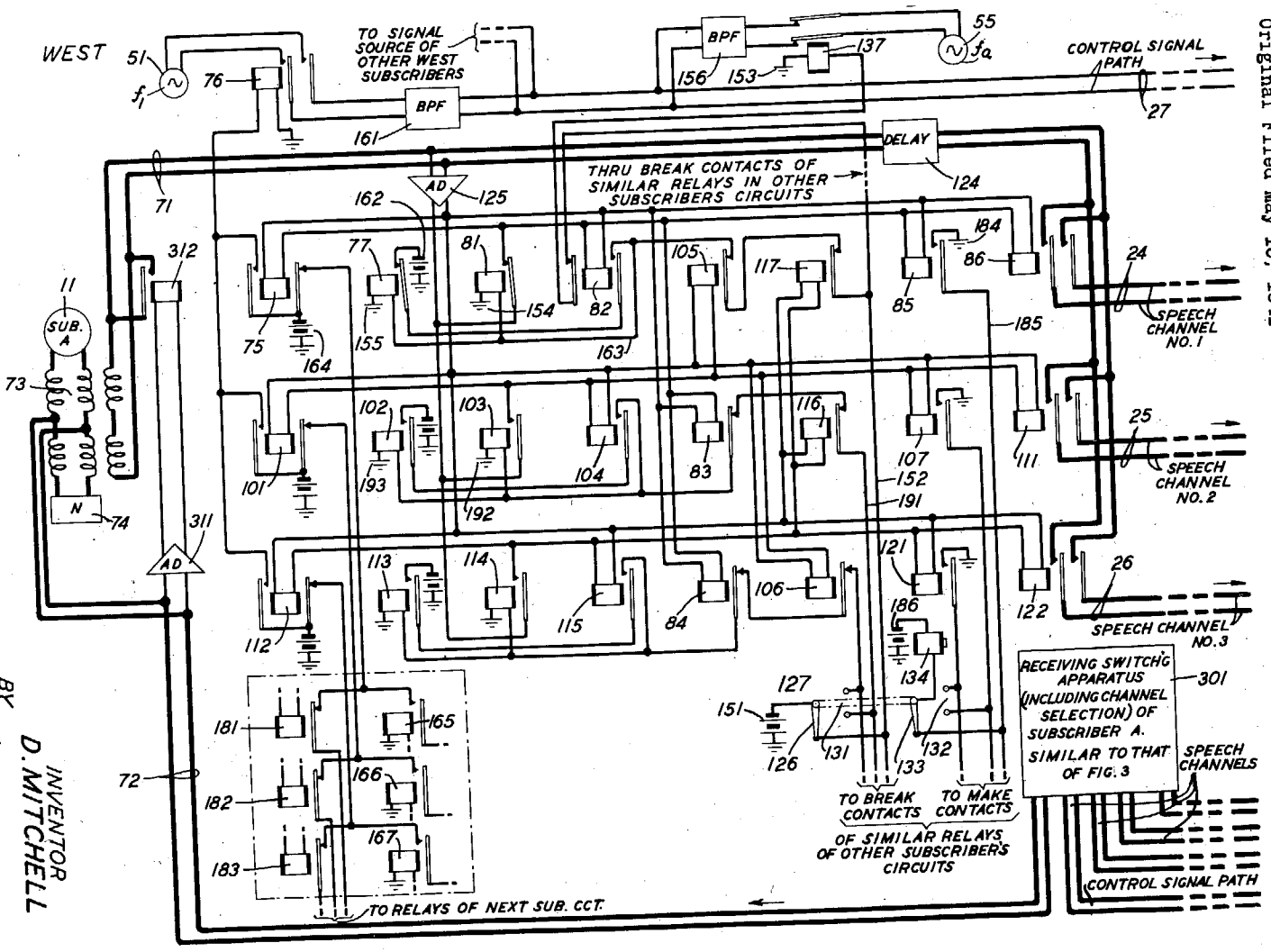
Fig. 2 shows in detail the transmitting switching arrangement associated with one of the subscriber's telephone circuits of Fig. 1.

The west terminal switching apparatus is represented by box 45 and the east terminal switching apparatus by box 46; details of these switching arrangements will be brought out by subsequent description of Figs. 2 and 3.

The telephone circuit of each of the west subscriber's sets has associated therewith an oscillator; each of these oscillators produces a distinctive tone frequency. For example, the telephone circuit of subscriber's set 11 has associated therewith oscillator 51 which produces a tone of frequency $f_1$, the telephone circuit of subscriber's set 12 has associated therewith oscillator 52 which produces a tone of frequency $f_2$ and so on. Similarly, the telephone circuit of each of the east subscriber's sets has associated therewith an oscillator which produces a tone of the same frequency as that produced by the oscillator associated with the corresponding west subscriber's set. For example, the telephone circuit of subscriber's set 16 has associated therewith oscillator 53 which produces a tone of frequency $f_1$, the telephone circuit of subscriber's set 17 has associated therewith oscillator 54 which produces a tone of frequency $f_2$ and so on. Oscillator 55 which produces a tone of frequency $f_a$ is provided at the west terminal and oscillator 56 which likewise produces a tone of frequency $f_a$ is provided at the east terminal; the purpose of these tones will be described subsequently.

It will be observed that in accordance with the arrangement contemplated by the present invention each of the control signal channels or paths 27 and 44 need transmit a frequency band only of sufficient breadth to include six different distinctive tones whereas in prior systems it was necessary to provide for transmission of a substantially greater frequency band. This reduction in the control frequency band results from the novel arrangement whereby not only is the sending end of the next speech transmission channel preselected but that the receiving end of the same speech channel is also preselected.

The operation of the terminal switching arrangements 45 and 46 will be described in detail in connection with Figs. 2 and 3; their operation will be described only briefly at this point. Let us assume that a conversation is taking place between subscriber A (set 11) and subscriber $A_1$ (set 16) and that a speech fragment of vocal interval duration originating at set 11 has just been applied to speech channel 24. Switching arrangement 45 operates at this time to do several things, among them being the application to control signal path 27 of the tones produced by oscillators 51 and 55. Tone produced by oscillator 51 actuates proper control apparatus of east terminal arrangement 46 in order to cause the speech fragment of vocal interval which it accompanied to be applied to the receiving side of the telephone circuit of subscriber's set 16; the tone produced by oscillator 55 performs certain regulatory functions which will be described subsequently in reference to Figs. 2 and 3. Switching arrangement 45 also acts at this time to preselect the transmitting end of the idle west-east speech channel (let us say channel 25) to which the next speech fragment of vocal interval duration originated by subscriber's set 11 or any of the other west sets will be applied. At the same time certain apparatus of switching arrangement 46 is conditioned to preselect the receiving end of that same channel whose sending end was preselected by apparatus of the west switching arrangement.

The next speech fragment of vocal interval duration originated by any of the west [subscriber's] *subscribers'* sets will be applied to speech channel 25, this channel having been preselected as described above. We will assume that this speech fragment comes from subscriber's set 12, subscriber B and subscriber $B_1$ being conversing. At the time the speech fragment is applied to speech channel 25 tone $f_2$ produced by oscillator 52 is applied to control signal path 27. This tone causes operation of certain apparatus of switching arrangement 46 effective to apply the speech fragment of vocal interval duration coming in over channel 25 to be applied to the receiving side of the telephone circuit of subscriber's set 17. It should be observed here that in view of the fact that both ends of speech channel 25 were preselected it is necessary to transmit only one control signal tone, i. e., a tone to identify the west subscriber, and that no channel identifying tone need be transmitted.

Speech fragments of vocal interval duration as they originate in any of the telephone circuits of the west terminal are, therefore, placed on the particular west-east channel which happened to be last preselected; no two consecutive speech fragments of vocal interval duration can be placed on the same speech channel in view of the preselection feature.

The arrangement functions in a similar manner for east-west transmission, the speech fragments of vocal interval duration together with the respective control tones being applied to speech channels 41, 42 and 43 in accordance with preselection of the sending and receiving ends thereof by switching arrangements 46 and 45, respectively.

It will be clear from the above that it will be very difficult for unauthorized persons who may listen in on the speech channels to interpret the messages being transmitted thereover as there will occur on any one of the channels snatches of several different conversations these conversation-parts appearing in a purely random manner.

It will also be apparent that the arrangement is effective as a speech channel saver. Thus in the specific system disclosed, only six one-way speech transmission channels and two control signal channels are utilized for interconnection of ten subscribers. With a larger number of subscribers it is possible to closely approach the ideal condition of having only one-third as many speech channels in one direction as there are subscribers and yet provide adequate facilities for uninterrupted transmission; the feasibility of such an arrangement is indicated by the previously recognized fact that during the time two subscribers are connected over a four-wire circuit either side of the circuit is actually in use only about one-third of the time. The substantial reduction in the frequency band necessary for the control signals which results from the novel arrangement of the present invention whereby both the sending and the receiving end of the speech channels are preselected makes adoption of the system to use by a relatively large number of subscribers commercially feasible.

Referring now to Figs. 2 and 3, which should be joined left to right, respectively, a detailed showing is set forth of a portion of the switching apparatus of the west terminal (Fig. 2) and a portion of the switching apparatus of the east terminal (Fig. 3). In order to avoid confusing duplication of similar apparatus, the detailed disclosure has been confined, so far as clarity and completeness of description will permit, to a showing of the transmitting switching apparatus of west subscriber A (Fig. 2) and the receiving switching apparatus of east subscriber $A_1$ (Fig. 3).

Subscriber's set 11 is coupled to transmitting line 71 and receiving line 72 by transformer 73, network 74 serving to provide a proper balance in the well-known manner. Transmitting line 71 may be connected through operation of certain relays, which will be described in detail subsequently, to any one of the three west-east speech channels 24, 25 or 26; receiving line 72 may be connected through operation of other relays to any one of the three east-west channels 41, 42 or 43.

It will be observed that the relays of the transmitting switching apparatus illustrated in Fig. 2 may, in general, be separated into three groups, one group being associated with each west-east speech channel. For example, it will be apparent from the subsequent description that relays 75, [76,] 77, 81, 82, 83, 84, 85 and 86 are associated with speech channel 24; that relays 101, 102, 103, 104, 105, 106, 107 and 111 are associated with speech channel 25; and that relays 112, 113, 114, 115, 116, 117, 121 and 122 are associated with speech channel 26.

Speech energy emanating from subscriber's set 11 follows two parallel paths, one path through delay network 124 and out over channel 24, 25 or 26 depending upon which group of relays is operated, and the other path through amplifier-detector 125 to the various relay circuits.

In general, selection of the west-east speech channel is dependent upon the position of brush 126 of rotary selector switch 127; operation of this selector switch when a speech fragment of vocal interval duration is applied to a channel is effective to preselect the next speech channel in a manner that will be clear from subsequent description. The switch may be of the general type disclosed in O. F. Forsberg et al. Patent 1,472,465 and comprises two banks 131 and 132, two brushes 126 and 133 cooperating therewith and stepping magnet 134. It will be understood that the two brushes are coupled mechanically so that energization of stepping magnet 134 causes rotation of both brushes. Selector switch 127 is common to all the [subscriber's] *subscribers'* telephone circuits of the west terminal.

For purposes of further illustration of the invention the operation of the circuits of Figs. 2 and 3 will now be described in detail. In the condition illustrated, relays 77, 81 and 137 (Fig. 2) are operated over energizing circuits traced from battery 151, brush 126 and first contact of selector bank 131, line 152 and thence over two paths, one *comprising an armature and break contact of relay 82, the armatures and break contacts of similar relays in other subscribers' circuits and thence* through the winding of relay 137 to ground 153 and the other through break contact of relay 117, break contact of relay 105, operating winding of relay 81 to ground 154 and operating winding of relay 77 to ground 155.

Relay 137 being operated, control tone of frequency $f_a$ produced by source 55 is applied through band-pass filter 156 to west-east control signal path 27 for a purpose which will be described in detail subsequently.

Assuming now that subscriber A speaks, speech energy produced by subscriber's set 11 is transmitted through transformer 73 to transmitting line 71. As the energy is delayed somewhat in its passage to the west-east speech channels by delay network 124, let us see first what actions result from passage of a portion of the energy through amplifier-detector 125.

In view of the fact that relay 81 is in operated position, we have obvious completed paths through the operating windings of relays 82, 83, 84, 85, 86, [75 and 76] *and 75* all of which relays are therefore now operated by the energy from amplifier-detector 125. *An obvious path is also completed from the battery 164 to the operating winding of relay 76 by the operation of relay 75 so that relay 76 is also in operated position.*

Operation of relay 76 applies control tone of frequency $f_1$ produced by source 51 to west-east control signal path 27 through band-pass filter 161; the purpose of this control tone will be described subsequently. Operation of relay 86 connects transmitting line 71 to west-east speech channel 24 so that the speech energy after traversing delay network 124 is sent out over speech channel 24.

Operation of relay 82 *releases relay 137 and* establishes a locking path over which relays 77 and 81 are held operated, this path being traced from battery 162, make contact of relay 77, make contact of relay 82, line 163 and through the operating windings of relays 81 and 77 to respective grounds 154 and 155.

Operation of relay 75 is effective to remove battery 164 from the make contact of relay 165. Relays 165, 166 and 167 are associated with the switching circuits of a second subscriber and correspond respectively to relays 77, 102 and 113 of subscriber A. Relays 181, 182 and 183 are also associated with the circuits of a second subscriber and correspond respectively to relays 75, 101 and 112. In the instance of relays 165, 166 and 167 however, a connection to battery is not obtained directly through a contact of the respective relay but only from the break contact of a relay in the circuits of subscriber's set 11 and, then, only if said relay be in unoperated position. This arrangement is provided so that even if two subscribers were to start talking at the same instant there would be no chance of the speech of both being placed on the same channel. For example with the circuits in the condition just described there is no chance of a second subscriber breaking in on channel 24 with subscriber A as operation of relay 75 has removed battery from the make contact of relay 165 whereupon the holding circuit for relays in the other subscriber's circuit corresponding to relays 77 and 81 cannot be established. In the instance of the switching circuits of the third subscriber, the battery supply path also includes the break contacts of relays 181, 182 and 183 of the second subscriber's circuit; in the instance of subsequent subscriber's circuits the path includes the break contact of a corresponding relay of the preceding circuit. Thus, for example, if the second subscriber (B) and the fourth subscriber (D) were to start talking simultaneously, subscriber A being idle, subscriber B would be put on the next idle channel and the connection of subscriber D thereto at the same time would be prevented due to the break in the battery supply path resulting from operation of relay 181.

Operation of relay 83 causes a break in the path connecting certain of the relays of the group associated with channel 25 to the second contact of selector bank 131; operation of relay 84 causes a similar break in the group of relays associated with channel 26.

Operation of relay 85 completes an energizing path for selector stepping magnet 134 which may be traced from ground 184, make contact of relay 85, line 185, first contact of selector bank 132, brush 133, operating winding of stepping magnet 134 to battery 186. Brush 133 is therefore stepped around to the second contact of bank 132 where it comes to reset. Had this contact been marked "busy" by the connection of ground thereto due to the operation of relay 107 (or a corresponding relay of a switching circuit of another subscriber) brush 133 would, of course, continue its rotation until it reached an "idle" contact of bank 132.

As brushes 126 and 133 are coupled mechanically, rotation of brush 133 to the second contact of bank 132 will cause a corresponding rotation of brush 126 to the second contact of bank 131. This rotation of brush 126 to the second contact of bank 131 is effective to preselect the transmitting end of west-east channel 25 so that the next speech fragment of vocal interval duration produced by any of the [subscriber's] *subscribers'* sets of the west terminal will be applied thereto. This preselection of the transmitting end of channel 25 is accomplished by setting up an energizing path for those relays associated with other subscribers' sets which correspond to relays 102 and 103 of subscriber's set 11. In the instance of relays 102 and 103 this energizing path is prepared but not completed as relay 83 is now in operated position; the path when completed, i. e., when relay 83 is deenergized, may be traced from battery 151, brush 126, second contact of selector bank 131, line 191, break contact of relay 116, break contact of relay 83, operating winding of relay 103 to ground 192 and operating winding of relay 102 to ground 193. With this condition, therefore, the next speech fragment of vocal interval duration produced by any of the other west subscriber's sets is placed on channel 25; should subscriber A pause long enough for the relays associated with channel 24 to restore to normal position before any of the other west subscribers start talking, relays 102 and 103 will operate over the path described above and should he then resume speaking the resulting speech fragment will be placed on channel 25.

Although battery 151 was removed from line 152 as soon as brush 126 moved off the first contact of bank 131, relays 77 and 81 remain operated due to the locking path established by operation of relay 82.

We have now seen how control tones of frequency $f_a$ and $f_1$ have been applied to west-east control signal path 27; how the speech energy produced by subscriber's set 11 has been applied to the transmitting end of west-east speech channel 24; and how the transmitting end of west-east speech channel 25 has been preselected for application of the next speech fragment of vocal interval duration. Let us now see what has been happening at the receiving end (Fig. 3) and particularly how subscriber's set 16 has been connected to the receiving end of channel 24 and how the receiving end of channel 25 has been preselected.

There is included in the switching apparatus illustrated in Fig. 3, channel selector 211 of subscriber $A_1$, stepping selector 212 of subscriber $A_1$ and collecting selector 213 which is common to all of the east subscribers' sets. Brushes 214 and 215 of selector 211 (which are coupled mechanically) and brush 216 of selector 212 are coupled mechanically and are rotated in step by selector stepping magnet 217; brush 221 of selector 213 is rotated by selector stepping magnet 222. The contacts of the bank of selector 212 are connected in multiple to contacts of the banks of the stepping selectors of the other east subscribers.

It will be recalled from previous description of Fig. 2 that control tone of frequency $f_1$ is being transmitted over control signal path 27 at this time (when subscriber A is speaking). This control tone passes through band-pass filter 241, which is designed to pass only a narrow band of frequencies including $f_1$, to amplifier-detector 242. The energy emanating from amplifier-detector 242 causes the operation, over obvious paths, of relays 243, 244 and 245. Operation of relay 243 completes at its two make contacts a path over which the speech currents being received over speech channel 24 are applied to the receiving side of the telephone circuit of subscriber's set 16. A portion of this energy passes through amplifier-detector 246 and causes operation of relay 247 which places a shunt on the transmitting side of the telephone circuit of set 16 during the time speech is being received over the receiving side of the circuit. The speech currents produced by subscriber's set 11 of the west terminal are now received by subscriber's set 16 of the east terminal therefore.

Operation of relay 244 removes battery 251 from one side of the operating winding of stepping magnet 217 while operation of relay 245 places ground 252 on the other side of the winding of magnet 217 and on the first contact of the bank of stepping selector 212 and on the corresponding contacts of the banks of the stepping selectors of the other east subscribers.

Removal of battery 251 from the operating path of stepping magnet 217 prevents rotation of selectors 212 and 211 during the time speech and the control tone are being received over channel 24. With respect to the stepping selectors of the other east subscribers, however, (assuming that west subscriber A is the only one talking) presence of ground 252 on the first contacts of the stepping selector banks completes energizing paths through the respective stepping magnets (corresponding to magnet 217) to the respective batteries (corresponding to battery 251) and causes the stepping brushes (corresponding to brush 216) and the two coupled brushes of the channel selectors (corresponding to brushes 214 and 215) to move to the second position of the respective banks. Ground 252 is also connected to the first contact of the bank of collecting selector 213 which causes the collecting selector also to move to the second contact of its bank as battery 253 is connected to one side of the operating winding of stepping magnet 222. By the above action, it will be obvious that the receiving end of speech channel 25 has now been preselected.

The above described condition prevails so long as subscriber A alone is talking; let us assume now that subscriber A ceases talking. The removal of control tone $f_1$ from path 27 results in relays 243, 244 and 245 dropping back to unoperated position.

Restoration of relay 245 to normal position removes ground 252 from the contacts of the stepping selector banks and from one side of the winding of stepping magnet 217; restoration of relay 244 reconnects battery 251 to the other side of the winding of stepping magnet 217. The brushes of selectors 212 and 211 are now moved to the second position of the respective banks as an operating path for magnet 217 is completed traced from battery 251, break contact of relay 244, winding of magnet 217, brush 216 and first contact of selector 212, resistance 254 to ground 255. It should be kept in mind that at this time relays 271 and 272 are in unoperated position as the control tone $f_a$, which is applied to control path 27 whenever brush 126 (Fig. 2) is in its first position, is not now being transmitted. The brushes of selectors 212 and 211 will stop in the second position therefore due to the fact that a high potential is placed at the junction of resistance 273 and the second contacts of all the stepping selector banks by the connection thereto of battery 253 through resistance 274 and the winding of magnet 222 in parallel. The constants of the system are so arranged that the difference between the battery voltage on stepping magnet 217 and the voltage at the junction of resistance 273 and the second contact of the banks will be less than the value required for stepping action. The above is true also of collecting selector 213 so that brush 221 remains in the second position; unless a dead ground (corresponding to ground 252) is placed on a contact of one of the stepping selectors, magnet 222 is in effect shunted by resistance 274 and the current through resistance 273 is not sufficient to cause the collecting selector to operate.

Recapitulating the detailed description of Figs. 1 and 2: the transmitting switching apparatus of the west terminal operated to place the speech energy produced by subscriber set 11 on the transmitting end of channel 24 while the receiving switching apparatus of the west terminal operated to connect the receiving end of channel 24 through to subscriber set 16 which is paired with subscriber set 11; the transmitting switching apparatus of the west terminal operated to preselect the transmitting end of channel 25 for all west subscribers except the "busy" subscriber who was left on channel 24 while the receiving switching apparatus of the east terminal operated to preselect the receiving end of channel 25 for all east subscribers except the "busy" subscriber who was left on channel 24; and certain switching equipment of the busy west subscriber was conditioned so that as soon as he stopped talking preselection of the transmitting end of channel 25 would be effective for his station also while, in view of the position assumed by the collecting selector at the east terminal, the circuits of the busy east subscriber are so conditioned that, as soon as the speech energy being received from the west terminal ceases, preselection of the receiving end of channel 25 becomes effective for this subscriber also. The above is on the assumption that only sets 11 and 16 are busy.

Let us consider now the purpose of control tone $f_a$ which, it will be recalled, is applied to control signal path 27 whenever selector brush 126 is in engagement with the first contact of selector bank 131. The purpose of this control tone is, briefly, to insure that the brush of collecting selector 213 is in step with the operation of the system and, if not, to restore synchronism at least once in each revolution. Let us assume that the circuit is in the condition illustrated in Figs. 2 and 3 except for the fact that brush 221 of the collecting selector is on the second contact of the bank instead of on the first contact as illustrated, i. e., in the assumed condition the collecting selector is out of step by one position. The control tone $f_a$ received over control signal path 27 is passed by band-pass filter 281, which is designed to pass a narrow band of frequencies including $f_a$, to amplifier-detector 282. The energy emanating from amplifier-detector 282 causes the operation, over obvious paths, of relays 271 and 272. Operation of relay 271 connects battery 275 through resistance 276, which is of relatively small resistance, to the junction of resistance 254 and the first contact of collecting selector 213 thereby, in effect, designating this contact as the "idle" position. Operation of relay 272 removes the shunt path through resistance 274 so that the full potential of battery 253 is now applied to magnet 222. If brush 221 is on the second contact therefore, as we have assumed, it will be stepped around until it reaches the first contact thereby restoring synchronism. Upon reaching the first contact it will stop due to the balancing potential applied thereto through resistance 276. This same action will take place, of course, with respect to the stepping selectors so that if any of them are idle and out of step they will also be collected and brought to the first position. "Busy" stepping selectors will not be affected as operation of the relay corresponding to relay 244 will in each case have removed the stepping battery.

This synchronizing action takes place once during each revolution of selector 127, that is, whenever brush 126 is in engagement with the first contact of bank 131.

It will be understood, of course, and is so indicated schematically, in Figs. 2 and 3 that subscriber A is provided, in addition to the transmitting switching apparatus which is illustrated, with receiving switching apparatus (indicated by box 301) which is generally similar to that illustrated in detail in Fig. 3 and that subscriber $A_1$ is provided, in addition to the receiving apparatus which is illustrated, with transmitting switching apparatus (indicated by box 302) which is generally similar to that illustrated in detail in Fig. 2. It follows from this that transmission from subscriber $A_1$ to A (east to west) is accomplished in a manner generally similar to west-east transmission which has been described in detail above. During reception by subscriber A, a portion of the speech energy being received over line 72 is passed into amplifier-detector 311 and the energy emanating therefrom causes operation of relay 312; operation of relay 312 places a shunt on transmitting line 71 during reception over line 72.

While a specific embodiment of the invention has been selected for detailed description it will be understood that the invention is not limited in its application to the embodiment described. The embodiment described should be taken as illustrative of the invention and not as restrictive thereof.

What is claimed is:

1. In a speech transmission system, a plurality of transmitters, an equal number of receivers, a plurality of speech transmission channels, means for applying a speech fragment of a duration equal to a vocal interval produced by one of said transmitters to a selected one of said speech transmission channels, and means operated by energy resulting from production of a speech fragment of vocal interval duration by one of said transmitters to preselect both the sending end and the receiving end of an idle speech channel for transmission of the next succeeding speech fragment of such duration.

2. In a speech transmission system including a plurality of transmitters, an equal number of receivers and a plurality of speech transmission channels between said transmitters and said receivers, the method of maintaining secrecy during the transmission of speech from said transmitters to said receivers which comprises impressing each successive speech fragment of a duration equal to a vocal interval produced by said transmitters on a different one of said channels and preselecting both the transmitting end and the receiving end of an idle channel for transmission of the next succeeding speech fragment of vocal interval duration each time a speech fragment of such duration is applied to a channel.

3. In a speech transmission system, a plurality of transmitters, a plurality of receivers, a plurality of speech transmission channels between said transmitters and said receivers, the number of said channels being less than that of said transmitters or said receivers, means operated by energy resulting from production of a speech fragment of a duration equal to a vocal interval by one of said transmitters for connecting the output thereof to a selected one of said channels, means for maintaining said connection during the duration of said speech fragment and means also operated by said energy for preselecting both the transmitting end and the receiving end of an idle speech transmission channel for transmission of the next succeeding speech fragment of such duration.

4. In a speech transmission system including a west terminal and an east terminal, a plurality of transmitters at the west terminal, a corresponding number of receivers at the east terminal, a plurality of speech transmission channels between said terminals, means at the west terminal operated by energy resulting from production of a speech fragment of a duration equal to a vocal interval by one of said transmitters for connecting the output thereof to the transmitting end of a predetermined one of said speech transmission channels, means at said east terminal for simultaneously connecting the input of a selected one of said receivers to the receiving end of the same channel, means for maintaining said connections during the duration of said speech fragment, means at said west terminal also operated by said energy for preselecting the transmitting end of an idle speech transmission channel for application of the next succeeding speech fragment of such duration and means at the east terminal for simultaneously preselecting the receiving end of that same channel the transmitting end of which is preselected at the west terminal.

5. In a speech transmission system including a west terminal and an east terminal, a plurality of transmitters at the west terminal, a corresponding number of receivers at the east terminal, a plurality of speech transmission channels between said terminals, means at said west terminal for applying a speech fragment of vocal interval duration produced by one of said transmitters to a selected one of said speech transmission channels, means including a rotatable element at said west terminal operated by energy resulting from production of a speech fragment of vocal interval duration by one of said transmitters to preselect the transmitting end of an idle speech transmission channel for application of the next succeeding speech fragment of such duration, means at said east terminal including a rotatable element for simultaneously preselecting the receiving end of the same idle speech transmission channel, and means operating once during each rotation of said rotatable element of said west terminal preselecting means for bringing said two rotatable elements into positional synchronism.

6. In a speech transmission system including a west terminal and an east terminal, a plurality of transmitters at the west terminal, a corresponding number of receivers at the east terminal, a plurality of speech transmission channels between said terminals, a control signal path between said terminals, means operated by the energy resulting from production of a speech fragment of vocal interval duration by one of said transmitters for connecting the output of said transmitter to the west terminal end of a selected one of said speech transmission channels, means at said west terminal for applying a tone signal of distinctive frequency to said control signal path, means at the east terminal operated by said tone signal to connect the input of a selected one of said receivers to the east terminal end of said selected speech channel, means at said west terminal operated by the energy resulting from production of said speech fragment to preselect the west terminal end of another of said speech transmission channels for subsequent transmission of speech energy produced by one of said transmitters and means at said east terminal for simultaneously preselecting the east terminal end of that speech transmission channel the west terminal end of which was preselected by said previously mentioned means.

7. In a speech transmission system including a pair of separated terminals, a plurality of subscriber's telephone sets at each of said terminals, a plurality of speech transmission channels between said terminals, the number of said channels being less than the number of said sets, means for establishing varying interconnections between said subscriber's sets and said channels whereby each successive speech fragment of a duration equal to a vocal interval produced by any of said sets at one of said terminals is placed on a different speech channel than that on which the preceding fragment of such duration was placed, said means operating each time a speech fragment of vocal interval duration is applied to one of said channels to preselect both the sending end and the receiving end of an idle speech channel for transmission of the next succeeding speech fragment of such duration produced by any of said sets at said terminal.

8. In a speech transmission system including a west terminal and an east terminal, a plurality of speech transmitters at the west terminal, a corresponding number of speech receivers at the east terminal, a plurality of speech transmission channels between said terminals, the number of said channels being less than the number of said transmitters and said receivers, means at said west terminal operated by energy caused by production of a speech fragment of vocal interval duration by a busy one of said transmitters for connecting the output thereof to the west terminal end of a predetermined one of said speech transmission channels, means at said east terminal for simultaneously connecting the input of a selected one of said receivers to the east terminal end of the same speech transmission channel, means for maintaining said connections to both ends of said channel during the duration of said speech fragment, means at said west terminal also operated by said energy for preselecting the west terminal end of an idle one of said speech channels for transmission of the next succeeding speech fragment of vocal interval duration produced by any of the other of said speech transmitters, and means at said east terminal for preselecting the east terminal end of the same idle speech channel for reception by any of the other of said receivers, said last-mentioned west terminal means being effective also to condition circuits of said busy transmitter whereby upon termination of the speech fragment produced thereby the west terminal end of said preselected channel is made available thereto, said last-mentioned east terminal means being effective also to condition circuits of said selected one of said receivers whereby upon termination of the speech fragment produced by said busy transmitter the east terminal end of said preselected channel is made available to said selected receiver.

9. In a speech transmission system including a west terminal and an east terminal, a plurality of speech transmitters at the west terminal, a corresponding number of speech receivers at the east terminal, a plurality of speech transmission channels between said terminals, means operated by energy caused by production of a speech fragment of vocal interval duration by a busy one of said transmitters for connecting the output thereof to the west terminal end of a predetermined one of said speech transmission channels and for simultaneously connecting the input of a selected one of said receivers to the east terminal end of the same speech transmission channel, means also operated by said energy for placing the outputs of all idle transmitters in connectible relationship to the west terminal end of an idle one of said speech transmission channels and for placing the inputs of all idle receivers in connectible relationship to the east terminal end of the same last-mentioned channel and means operated by energy caused by production of a speech fragment of vocal interval duration by one of said last-mentioned transmitters for completing the connection of the output thereof to the west terminal end of said last-mentioned channel and for simultaneously completing the connection of the input of a selected one of said last-mentioned receivers to the east terminal end of the same last-mentioned channel, said last-mentioned means also placing the outputs of all transmitters still idle in connectible relationship to the west terminal end of another idle one of said channels and the inputs of all receivers still idle in connectible relationship to the east terminal end of the same last-mentioned channel.

DOREN MITCHELL.

No references cited.